(12) United States Patent
Kinoshita

(10) Patent No.: US 10,377,245 B2
(45) Date of Patent: Aug. 13, 2019

(54) VEHICLE POWER SOURCE

(71) Applicant: SUBARU CORPORATION, Tokyo (JP)

(72) Inventor: Takahiro Kinoshita, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 244 days.

(21) Appl. No.: 15/381,602

(22) Filed: Dec. 16, 2016

(65) Prior Publication Data

US 2017/0182892 A1 Jun. 29, 2017

(30) Foreign Application Priority Data

Dec. 24, 2015 (JP) .................................. 2015-252055

(51) Int. Cl.
*B60L 1/00* (2006.01)
*B60L 3/00* (2019.01)
(Continued)

(52) U.S. Cl.
CPC ............. *B60L 11/02* (2013.01); *B60L 3/0061* (2013.01); *B60L 50/10* (2019.02); *B60L 58/20* (2019.02); *B60L 2220/50* (2013.01); *B60L 2240/12* (2013.01); *B60L 2250/10* (2013.01); *Y02T 10/70* (2013.01); *Y02T 10/7011* (2013.01); *Y02T 10/7016* (2013.01); *Y02T 10/7066* (2013.01); *Y02T 10/7077* (2013.01)

(58) Field of Classification Search
CPC .. B60L 11/02; B60L 11/1868; B60L 11/1877; B60L 3/0061; B60L 2220/50; B60L 2240/12; B60L 2250/10
USPC ..................................... 307/9.1, 10.1, 23, 91
See application file for complete search history.

(56) References Cited

U.S. PATENT DOCUMENTS

2015/0174998 A1* 6/2015 Okada ...................... B60K 6/46
701/22
2015/0329007 A1* 11/2015 Matsunaga ....... H01M 10/0525
320/126
2017/0057491 A1* 3/2017 Yoshimi ................... B60K 6/26

FOREIGN PATENT DOCUMENTS

JP 2008-048533 A 2/2008
JP 2010-068689 A 3/2010
(Continued)

OTHER PUBLICATIONS

Office Action issued in corresponding Japanese Patent Application No. 2015-252055, dated Jun. 20, 2017.

*Primary Examiner* — Rexford N Barnie
*Assistant Examiner* — Toan T Vu
(74) *Attorney, Agent, or Firm* — McDermott Will & Emery LLP

(57) ABSTRACT

A vehicle power source includes a motor generator, a power storage, a switch, an abnormality detector, and a switch controller. The motor generator is coupled to an engine. The power storage is coupled to the motor generator. The switch is controlled between a conductive state and a cut-off state, in which the conductive state involves coupling the motor generator to the power storage, and the cut-off state involves separating the motor generator from the power storage. The abnormality detector is provided separately from the motor generator and detects abnormality of the motor generator. The switch controller is provided separately from the motor generator and controls the switch from the conductive state to the cut-off state when the abnormality of the motor generator is detected.

16 Claims, 14 Drawing Sheets

(51) Int. Cl.
*H02G 3/00* (2006.01)
*B60L 11/02* (2006.01)
*B60L 50/10* (2019.01)
*B60L 58/20* (2019.01)

(56) References Cited

FOREIGN PATENT DOCUMENTS

JP  2013-150525 A  8/2013
JP  2014-036557 A  2/2014

\* cited by examiner

VEHICLE POWER SOURCE

CROSS-REFERENCE TO RELATED APPLICATIONS

The present application claims priority from Japanese Patent Application No. 2015-252055 filed on Dec. 24, 2015, the entire contents of which are hereby incorporated by reference.

BACKGROUND

The technology relates to a vehicle power source that may be mounted on a vehicle.

As a vehicle power source that may be mounted on a vehicle, a power source have been proposed that allows a motor generator to perform regenerative power generation in vehicle deceleration (refer to Japanese Unexamined Patent Application Publication (JP-A) No. 2014-36557). In many cases, such a power source may charge electric power generated by the motor generator in not only a lead battery but also a lithium ion battery. This makes it possible to efficiently recover regenerative electric power in the vehicle deceleration, and to enhance energy efficiency of the vehicle.

Since the motor generator is coupled to an engine, not only may the motor generator perform the regenerative power generation in the vehicle deceleration, the motor generator may also be often driven as a starter motor at engine restart, or driven in vehicle acceleration in view of reduction in an engine load. Such positive utilization of the motor generator contributes to the enhancement in the energy efficiency of the vehicle. In recent years, power generation performance and output performance of the motor generator have shown a tendency of enhancement, in order to attain even higher energy efficiency.

SUMMARY

In the vehicle power source, cost reduction is still desirable even in pursuit of such enhancement in the power generation performance and the output performance of the motor generator.

It is desirable to provide a vehicle power source that makes it possible to reduce costs of a vehicle power source.

An aspect of the technology provides a vehicle power source mounted on a vehicle, the vehicle power source including a motor generator, a power storage, a switch, an abnormality detector, and a switch controller. The motor generator is coupled to an engine. The power storage is coupled to the motor generator. The switch is controlled between a conductive state and a cut-off state, in which the conductive state involves coupling the motor generator to the power storage, and the cut-off state involves separating the motor generator from the power storage. The abnormality detector is provided separately from the motor generator and detects abnormality of the motor generator. The switch controller is provided separately from the motor generator and controls the switch from the conductive state to the cut-off state when the abnormality of the motor generator is detected.

DETAILED DESCRIPTION

Figure 1:
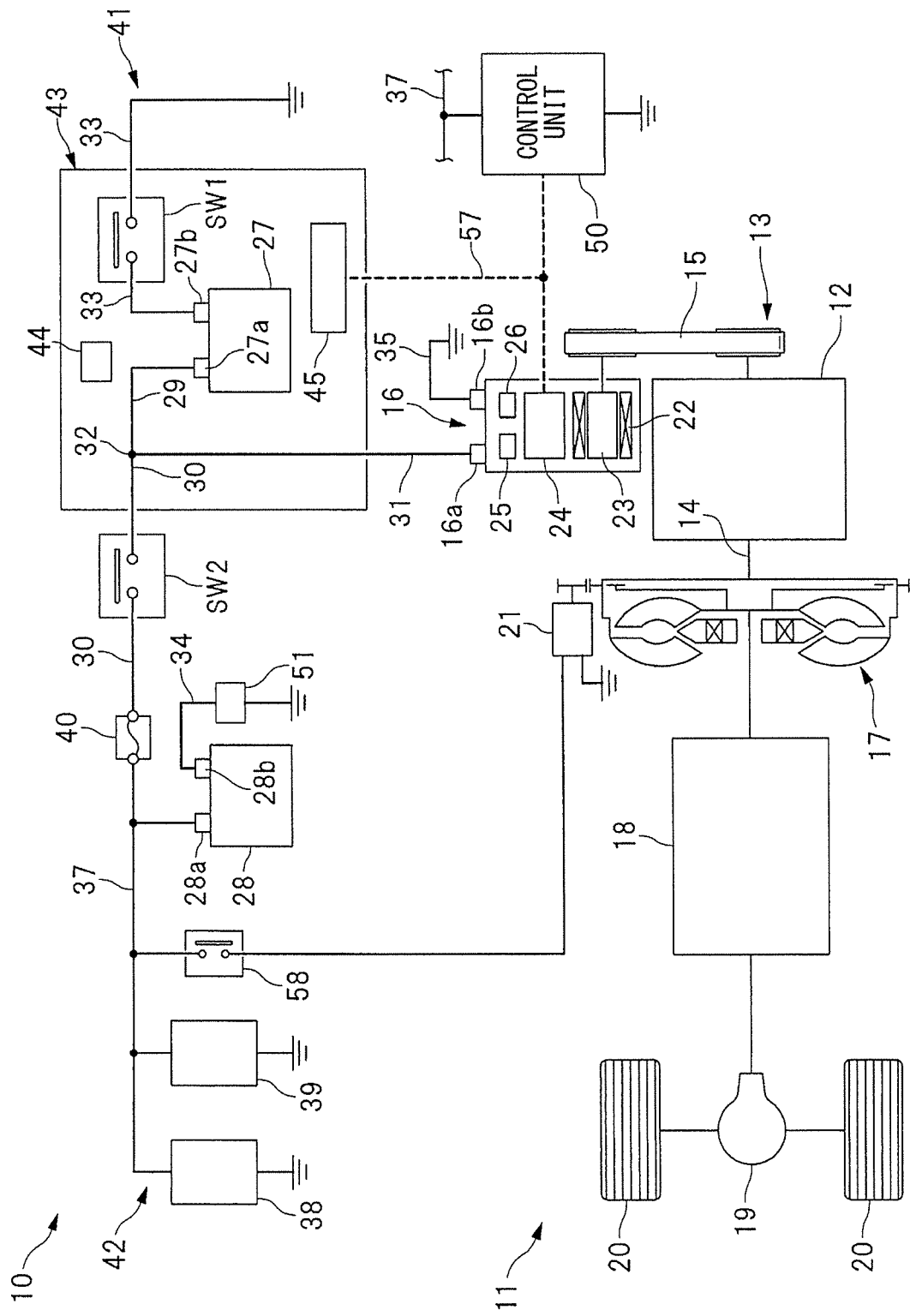
FIG. 1 schematically illustrates a configuration example of a vehicle including a vehicle power source according to an implementation of the technology.

In the following, some implementations of the technology are described in detail with reference to the drawings. FIG. 1 schematically illustrates a configuration example of a vehicle 11 including a vehicle power source 10 according to an implementation of the technology. Referring to FIG. 1, the vehicle 11 may include a power unit 13 having an engine 12. The engine 12 may include a crank shaft 14 to which a motor generator 16 may be coupled through a belt mechanism 15. Thus, the motor generator 16 is mechanically coupled to the engine 12. A transmission mechanism 18 may be also coupled to the engine 12 through a torque converter 17. One or more wheels 20 may be coupled to the transmission mechanism 18 through a differential mechanism 19 or other parts. The power unit 13 may further include a starter motor 21 that causes starting revolution of the crank shaft 14.

The motor generator 16 may be a so-called integrated starter generator (ISG). Not only may the motor generator 16 serve as a generator that is driven by the crank shaft 14 to generate power, the motor generator 16 may also serve as an electric motor that causes the starting revolution of the crank shaft 14. The motor generator 16 may include a stator 22 and a rotor 23; the stator 22 may include a stator coil, and the rotor 23 may include a field coil. The motor generator 16 may further include an ISG controller 24, in order to control energized states of the stator coil and the field coil. The ISG controller 24 may include an inverter, a regulator, a microcomputer, and other parts. The motor generator 16 may further include a voltage sensor 25 and a current sensor 26. The voltage sensor 25 may detect a generated voltage. The current sensor 26 may detect a generated current. Allowing the ISG controller 24 to control the energized states of the field coil and the stator coil makes it possible to control the generated voltage and the generated current of the motor generator 16 that may serve as the generator. Also, allowing the ISG controller 24 to control the energized states of the field coil and the stator coil makes it possible to control driving torque and the number of revolutions of the motor generator 16 that may serve as the electric motor.

Figure 2:
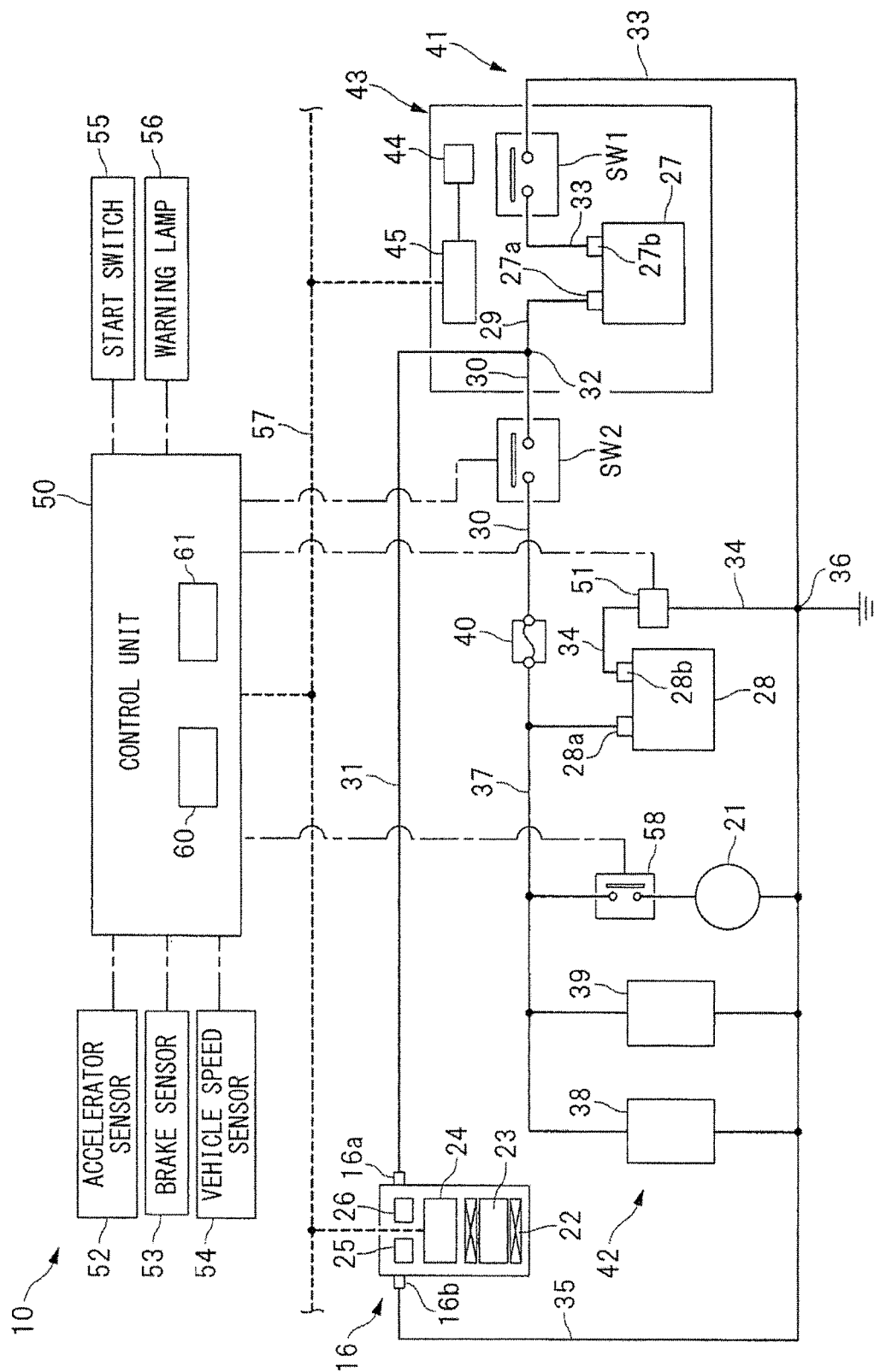
FIG. 2 is a circuit diagram of a configuration example of the vehicle power source.
Figure 3:
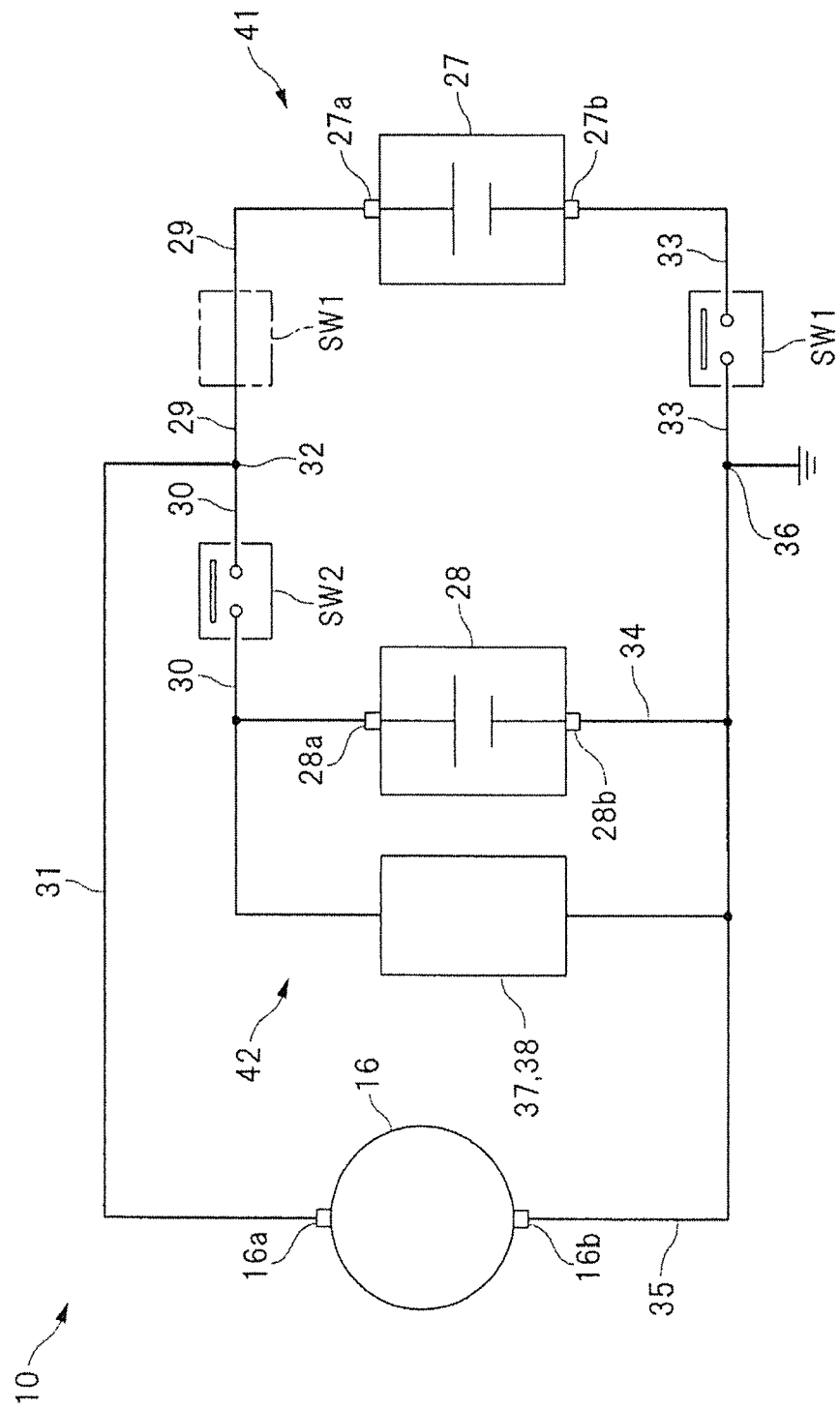
FIG. 3 is a simplified circuit diagram of a configuration of the vehicle power source.

Description is given next in detail of a configuration of the vehicle power source 10. FIG. 2 is a circuit diagram of a configuration example of the vehicle power source 10. FIG. 3 is a simplified circuit diagram of a configuration of the vehicle power source 10. Referring to FIGS. 1 to 3, the vehicle power source 10 may include a lithium ion battery 27 and a lead battery 28. The lead battery 28 may be coupled in parallel to the lithium ion battery 27. In one implementation of the technology, the lithium ion battery 27 may serve as a "first power storage" or a "power storage", and the lead battery 28 may serve as a "second power storage" or the "power storage". The lithium ion battery 27 and the lead battery 28 may be coupled, in parallel with one another, to the motor generator 16.

A positive electrode line 29 may be coupled to a positive electrode terminal 27a of the lithium ion battery 27. In one implementation of the technology, the positive electrode line 29 may serve as a "first conduction path". A positive electrode line 30 may be coupled to a positive electrode terminal 28a of the lead battery 28. In one implementation of the technology, the positive electrode line 30 may serve as a "second conduction path". Moreover, the motor generator 16 may include a positive electrode terminal 16a that supplies the generated current of the motor generator 16. A positive electrode line 31 may be coupled to the positive electrode terminal 16a. In one implementation of the technology, the positive electrode line 31 may serve as a "third conduction path". The positive electrode lines 29 to 31 may be coupled to one another through a connection point 32. Furthermore, a negative electrode line 33 may be coupled to a negative electrode terminal 27b of the lithium ion battery 27. A negative electrode line 34 may be coupled to a negative electrode terminal 28b of the lead battery 28. A negative electrode line 35 may be coupled to a negative electrode terminal 16b of the motor generator 16. The negative electrode lines 33 to 35 may be coupled to a reference potential point 36.

The negative electrode line 33 coupled to the lithium ion battery 27 may be provided with an ON/OFF switch SW1. In one implementation of the technology, the ON/OFF switch SW1 may serve as a "first switch" or a "switch". The positive electrode line 30 coupled to the lead battery 28 may be provided with an ON/OFF switch SW2. In one implementation of the technology, the ON/OFF switch SW2 may serve as a "second switch" or the "switch". The ON/OFF switches SW1 and SW2 each may be a semiconductor switch that includes a semiconductor element such as, but not limited to, a MOSFET. As this semiconductor switch, for example, a semiconductor switch may be utilized that includes a plurality of semiconductor elements coupled in parallel with one another. The ON/OFF switches SW1 and SW2 may operate in a closed state or a conductive state (i.e., an ON state) and in an open state or a cut-off state (i.e., an OFF state).

In other words, the ON/OFF switch SW1 may be switched between the conductive state and the cut-off state; the conductive state may involve electrical coupling of the motor generator 16 to the lithium ion battery 27, and the cut-off state may involve electrical separation of the motor generator 16 from the lithium ion battery 27. Similarly, the ON/OFF switch SW2 may be switched between the conductive state and the cut-off state; the conductive state may involve electrical coupling of the motor generator 16 to the lead battery 28, and the cut-off state may involve electrical separation of the motor generator 16 from the lead battery 28. Note that, in the illustrated example, the ON/OFF switch SW1 may be inserted in the negative electrode line 33 coupled to the lithium ion battery 27, but this is non-limiting. In one example, as indicated by an alternate long and short dash line in FIG. 3, the ON/OFF switch SW1 may be inserted in the positive electrode line 29 coupled to the lithium ion battery 27.

To the positive electrode line 30, for example, an instantaneous voltage drop protection load 38, a vehicle body load 39, and the starter motor 21 may be coupled through a positive electrode line 37. In other words, electric loads such as, but not limited to, the instantaneous voltage drop protection load 38, the vehicle body load 39, and the starter motor 21 may be coupled to the positive electrode terminal 28a of the lead battery 28 through the positive electrode line 37. In one implementation of the technology, the positive electrode line 37 may serve as a "fourth conduction path". Also, the positive electrode line 30 may be provided with a fuse 40. The fuse 40 may protect the instantaneous voltage drop protection load 38, the vehicle body load 39, the starter motor 21, and other parts. Note that the instantaneous voltage drop protection load 38 may be an electric load that ought to be kept in operation during engine restart in an idling stop control. Non-limiting examples of the instantaneous voltage drop protection load 38 may include engine auxiliaries, a brake actuator, a power steering actuator, an instrumental panel, and various controllers. Also, the vehicle body load 39 may be an electric load whose instantaneous shut-down is allowable during the engine restart in the idling stop control. Non-limiting examples of the vehicle body load 39 may include a door mirror motor, a power window motor, and a radiator fan motor.

As illustrated in FIGS. 1 and 2, the vehicle power source 10 may include a first power circuit 41 that includes the lithium ion battery 27 and the motor generator 16. The vehicle power source 10 may also include a second power circuit 42 that includes components such as, but not limited to, the lead battery 28, the instantaneous voltage drop protection load 38, the vehicle body load 39, and the starter motor 21. The first power circuit 41 and the second power circuit 42 may be coupled to each other through the ON/OFF switch SW2. Note that the ON/OFF switch SW1 provided in the first power circuit 41 may serve as a switch that electrically separates the lithium ion battery 27 from the vehicle power source 10. Furthermore, the vehicle power source 10 may include a battery module 43. In the battery module 43, the lithium ion battery 27 and the ON/OFF switch SW1 may be incorporated.

The battery module 43 may include a battery sensor 44 that detects a current, a voltage, temperature, and other characteristics of the lithium ion battery 27. Moreover, the battery module 43 may include a battery controller 45, in order to control operation states of the ON/OFF switch SW1. The battery controller 45 may include, for example, a drive circuit and a microcomputer. The battery controller 45 may control the ON/OFF switch SW1, on the basis of control signals from a control unit 50, as described later. Also, the battery controller 45 may open the ON/OFF switch SW1 to separate the lithium ion battery 27 from the vehicle power source 10, when an excessive charge and discharge current or an excessive increase in temperature of the lithium ion battery 27 is detected.

As illustrated in FIG. 2, the vehicle power source 10 includes a control unit 50 that controls the motor generator 16, the battery module 43, the ON/OFF switch SW2, and other parts. The control unit 50 may have a function of controlling charge and discharge of the lithium ion battery 27, by controlling the generated voltage and other characteristics of the motor generator 16. In one specific but non-limiting implementation, the control unit 50 may determine a state of charge of the lithium ion battery 27 and operation states of an accelerator pedal and a brake pedal, on the basis of input signals from other controllers and sensors. The control unit 50 may control the generated voltage and the generated current of the motor generator 16, on the basis of the state of charge of the lithium ion battery 27 and current consumption of the vehicle body load 39 and other parts, and control the charge and discharge of the lithium ion battery 27. Note that the control unit 50 may control the generated voltage and the generated current of the motor generator 16, by outputting control signals to the ISG controller 24.

The control unit 50 may also have a function of controlling stop and restart of the engine 12. The control unit 50 may determine a stop condition and a start condition of the engine 12, on the basis of input signals from other controllers and sensors. The control unit 50 may automatically stop the engine 12 when the stop condition is established, and automatically restart the engine 12 when the start condition is established. A non-limiting example of the stop condition of the engine 12 may be that a vehicle speed is equal to or lower than a predetermined vehicle speed and the brake pedal is stepped down. Non-limiting examples of the start condition of the engine 12 may include that stepping down of the brake pedal is released, and that the accelerator pedal is stepped down.

The control unit 50 may be coupled to sensors such as, but not limited to, a battery sensor 51, an accelerator sensor 52, and a brake sensor 53. The battery sensor 51 may detect a charge and discharge current, a state of charge, and other characteristics of the lead battery 28. The accelerator sensor 52 may detect an amount of stepping down of the accelerator pedal. The brake sensor 53 may detect an amount of stepping down of the brake pedal. The control unit 50 may be also coupled to other sensors such as, but not limited to, a vehicle speed sensor 54 and a start switch 55. The vehicle speed sensor 54 may detect a vehicle speed, i.e. a traveling speed of the vehicle 11. The start switch 55 may be manually operated in engine start. The control unit 50 may receive, from the ISG controller 24, the generated voltage, the generated current, power generation torque, the drive torque, and other characteristics of the motor generator 16. Similarly, the control unit 50 may receive, from the battery controller 45, characteristics such as the charge and discharge current, and the state of charge of the lithium ion battery 27, and the operation states of the ON/OFF switch SW1. Furthermore, a warning lamp 56 may be coupled to the control unit 50. The warning lamp 56 may inform an occupant of abnormality of the vehicle power source 10.

Note that the control unit 50 may include, for example, a microcomputer and a drive circuit. The microcomputer may include a CPU, ROM, RAM, and other components. The drive circuit may generate control currents of various actuators. The control unit 50, the motor generator 16, the battery module 43, and other parts may be coupled to one another through an on-vehicle network 57 such as, but not limited to, CAN and LIN. Moreover, as illustrated in FIG. 1, the control unit 50 may be coupled to the positive electrode line 37. The lead battery 28 may be coupled to the control unit 50 and serve as a power source for the control unit 50.

[Voltage Characteristics of Batteries]

Figure 4:
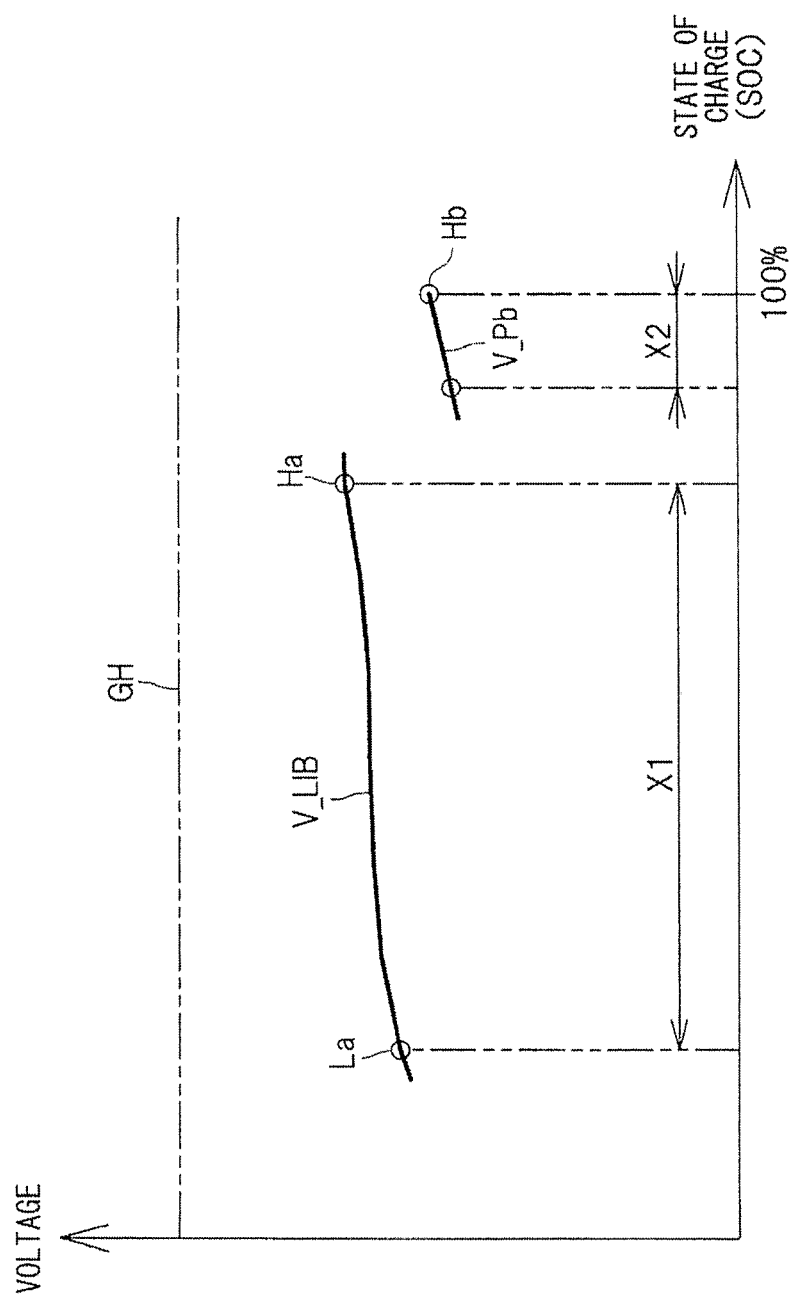
FIG. 4 is a diagram of relations between terminal voltages and states of charge in batteries.

Description is given next of voltage characteristics of the lithium ion battery 27 and the lead battery 28. FIG. 4 is a diagram of relations between terminal voltages and the states of charge SOC in the batteries. Note that a state of charge SOC is a value that indicates a degree of charge of a battery, or a ratio of a charged amount to design capacity of a battery. In FIG. 4, terminal voltages V_LIB and V_Pb indicate battery voltages with no current flowing therethrough, i.e., an open end voltage. Also, in FIG. 4, a reference character GH indicates a maximum generated voltage of the motor generator 16.

Referring to FIG. 4, the terminal voltage V_LIB of the lithium ion battery 27 may be set higher than the terminal voltage V_Pb of the lead battery 28. In other words, a lower limit voltage La of a charge and discharge range X1 of the lithium ion battery 27 may be set higher than an upper limit voltage Hb of a charge and discharge range X2 of the lead battery 28. Moreover, the terminal voltage V_LIB of the lithium ion battery 27 may be set lower than an upper limit (e.g., 16 V) of a charge voltage of the lead battery 28. In other words, an upper limit voltage Ha of the charge and discharge range X1 of the lithium ion battery 27 may be set lower than the upper limit of the charge voltage of the lead battery 28. This makes it possible to avoid excessive charge of the lead battery 28 by the lithium ion battery 27 even in a case of parallel connection of the lithium ion battery 27 and the lead battery 28, and to avoid deterioration of the lead battery 28. Note that an upper limit of a charge voltage is an upper limit value of a charge voltage, specified for each type of power storage in view of suppression of deterioration of a power storage.

As illustrated in FIG. 4, the lithium ion battery 27 may be provided with the broad charge and discharge range X1, owing to optimal cycle characteristics of the lithium ion battery 27. In contrast, the lead battery 28 may be provided with the narrow charge and discharge range X2 near full charge, in view of prevention of battery deterioration. Moreover, internal resistance of the lithium ion battery 27 may be set lower than internal resistance of the lead battery 28.

[Charge and Discharge Control of Lithium Ion Battery]

Figure 5:
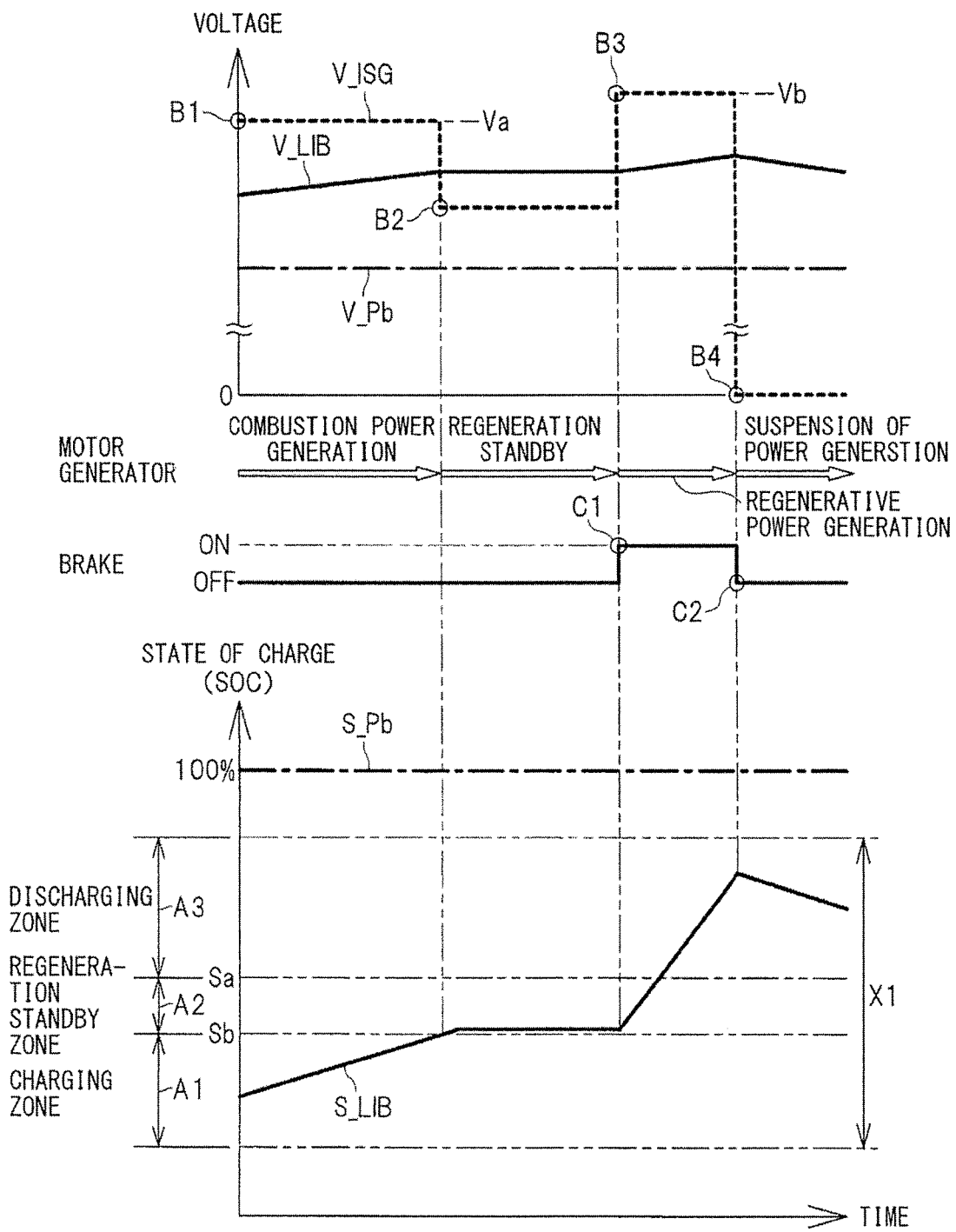
FIG. 5 is a timing chart of transition of control states in a motor generator and of states of charge in a lithium ion battery.
Figure 6:
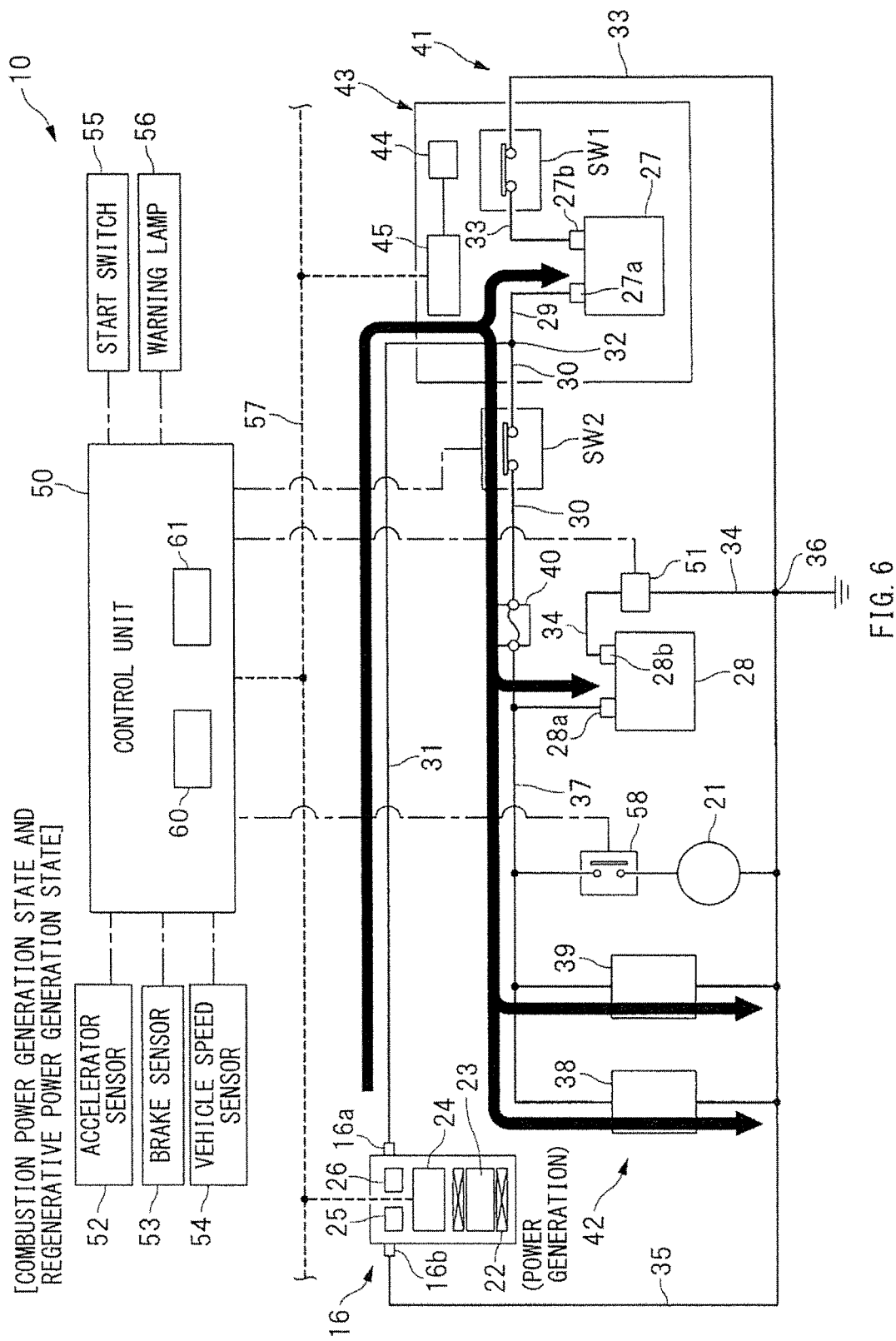
FIG. 6 illustrates a state of power supply of the vehicle power source.
Figure 7:
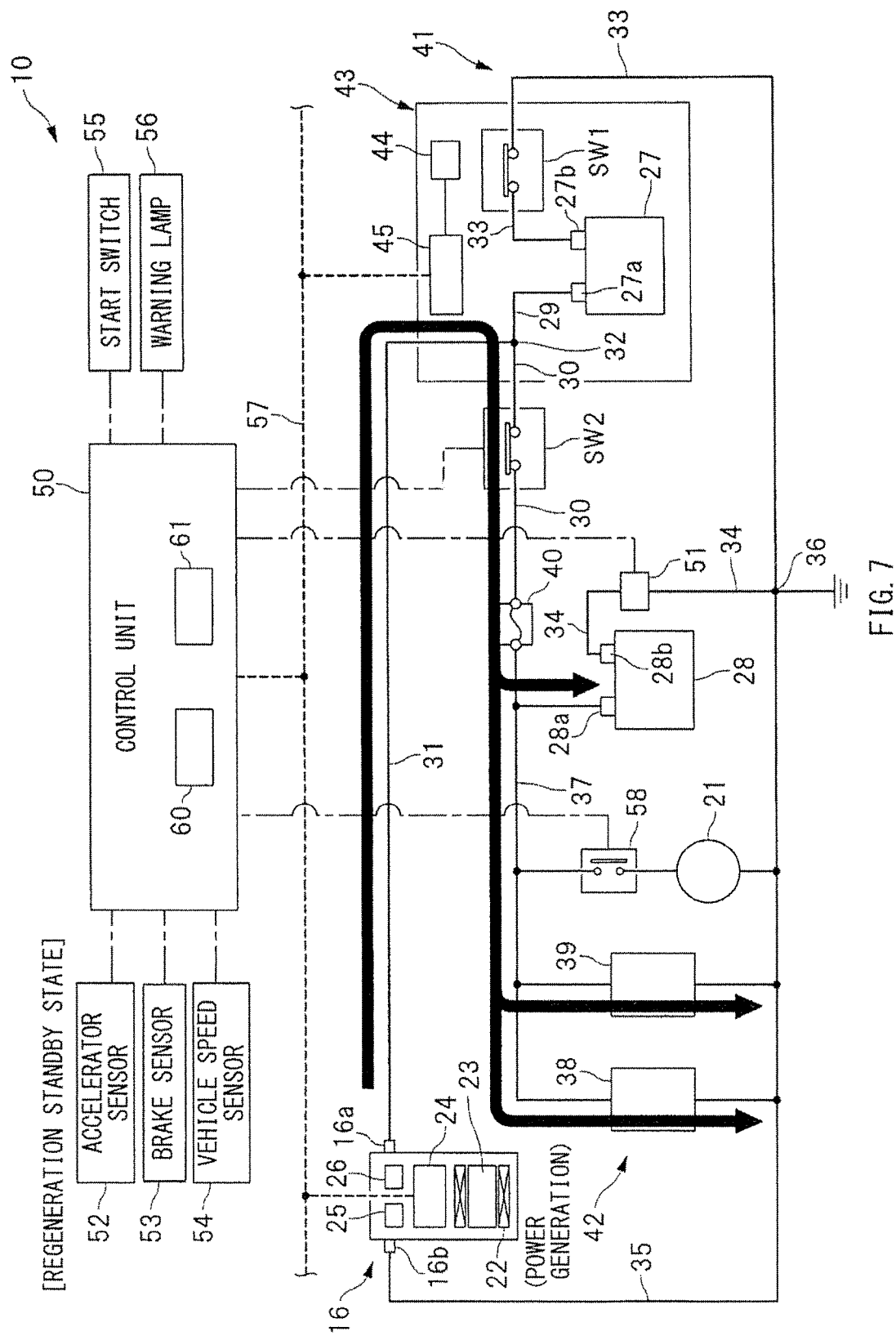
FIG. 7 illustrates a state of power supply of the vehicle power source.
Figure 8:
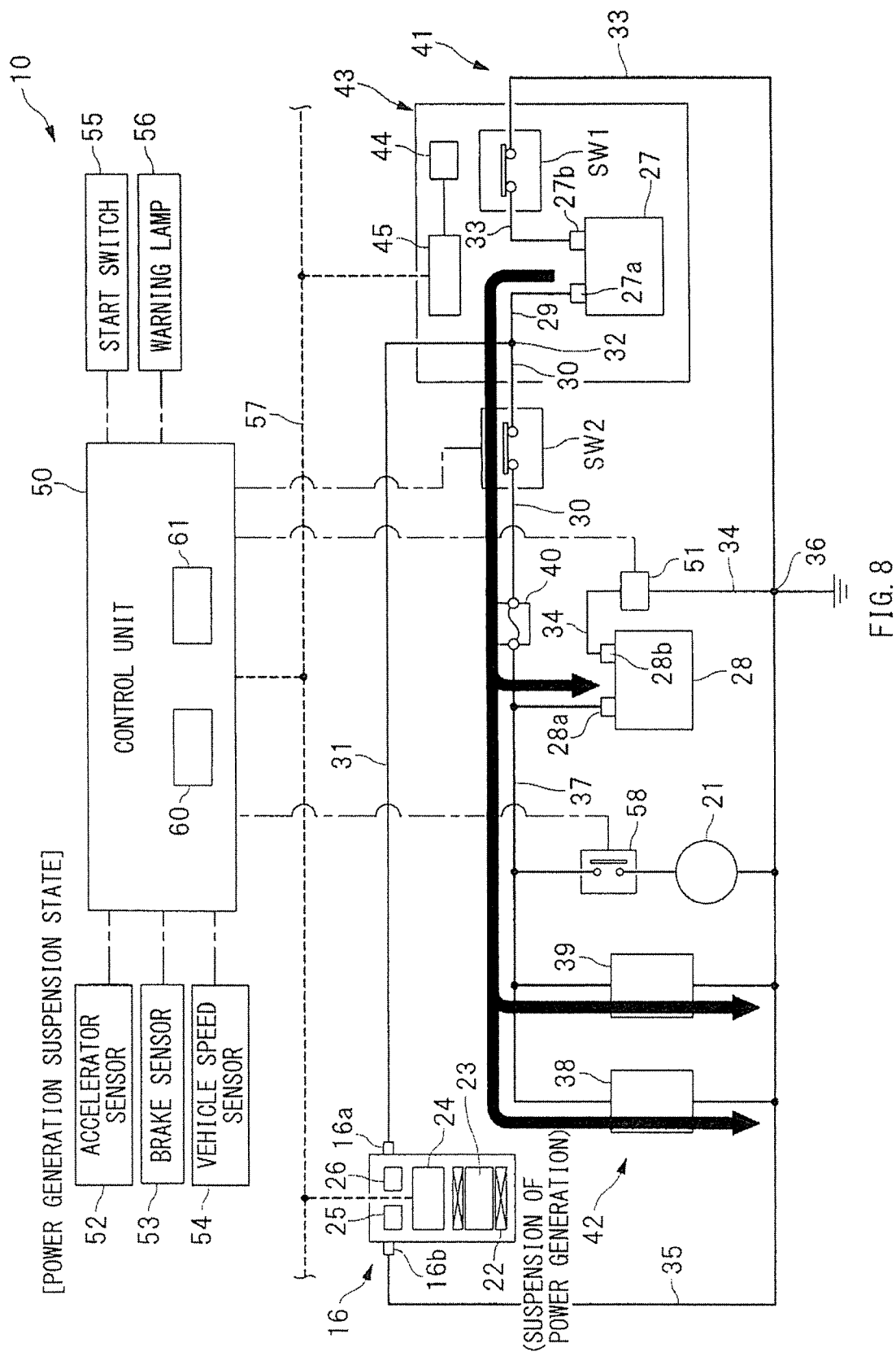
FIG. 8 illustrates a state of power supply of the vehicle power source.

Description is given next of the charge and discharge control of the lithium ion battery 27 with use of the motor generator 16. FIG. 5 is a timing chart of transition of control states of the motor generator 16 and of the states of charge S_LIB of the lithium ion battery 27. FIGS. 6 to 8 illustrate states of power supply of the vehicle power source 10. FIG. 6 illustrates a state in which the motor generator 16 is controlled to a combustion power generation state or a regenerative power generation state. FIG. 7 illustrates a state in which the motor generator 16 is controlled to a regeneration standby state. FIG. 8 illustrates a state in which the motor generator 16 is controlled to a power generation suspension state.

First, described is a case in which, as denoted by a reference character Al in FIG. 5, the state of charge S_LIB of the lithium ion battery 27 is lower than a predetermined value Sb, i.e., a case in which the state of charge S_LIB falls in a charging zone. The predetermined value Sb may be, for example, 30% without limitation. When the state of charge S_LIB falls in the charging zone, the motor generator 16 may be controlled to the combustion power generation state, in order to charge the lithium ion battery 27. Note that the combustion power generation state of the motor generator 16 may involve allowing the motor generator 16 to generate power with engine power, and converting thermal energy of fuel supplied to the engine 12 to electric energy. In controlling the motor generator 16 to the combustion power generation state, the generated voltage V_ISG of the motor generator 16 may be controlled to a predetermined voltage Va (a reference character B1) that is higher than the terminal voltage V_LIB of the lithium ion battery 27. This allows the generated current of the motor generator 16 to be supplied to the lithium ion battery 27, the vehicle body load 39, and other parts, as denoted by a solid black arrow in FIG. 6. Note that the ON/OFF switches SW1 and SW2 may be kept in the conductive state, in controlling the motor generator 16 to the combustion power generation state.

Now described is a case in which, as denoted by a reference character A2 in FIG. 5, the state of charge S_LIB of the lithium ion battery 27 is higher than the predetermined value Sb and lower than a predetermined value Sa, i.e., a case in which the state of charge S_LIB falls in a regeneration standby zone. The predetermined value Sa may be, for example, 40% without limitation. When the state of charge S_LIB falls in the regeneration standby zone, the motor generator 16 may be controlled to the regeneration standby state, in order to wait for an opportunity of regenerative power generation while suppressing the generated current of the motor generator 16. In controlling the motor generator 16 to the regeneration standby state, the generated voltage V_ISG of the motor generator 16 may be controlled to a predetermined voltage (a reference character B2) that is lower than the terminal voltage V_LIB of the lithium ion battery 27 and higher than the terminal voltage V_Pb of the lead battery 28. This allows the generated current of the motor generator 16 to be supplied to the second power circuit 42, as denoted by a solid black arrow in FIG. 7, to cover the current consumption of the vehicle body load 39 and other parts. Moreover, in the regeneration standby state of the motor generator 16, the charge and discharge current of the lithium ion battery 27 may be controlled to substantially "zero (0)". Note that the ON/OFF switches SW1 and SW2 may be kept in the conductive state, in controlling the motor generator 16 to the regeneration standby state.

Described next is a case in which, as denoted by a reference character A3 in FIG. 5, the state of charge S_LIB of the lithium ion battery 27 is higher than the predetermined value Sa, i.e., a case in which the state of charge S_LIB falls in a discharging zone. When the state of charge S_LIB falls in the discharging zone, the motor generator 16 may be controlled to a power generation suspension state, in order to positively allow the lithium ion battery 27 to discharge electric power stored therein. In controlling the motor generator 16 to the power generation suspension state, the generated voltage V_ISG of the motor generator 16 may be controlled to "zero (0)" (a reference character B4) that is lower than the terminal voltage V_LIB of the lithium ion battery 27. This allows the discharge current of the lithium ion battery 27 to be supplied to the second power circuit 42, as denoted by a solid black arrow in FIG. 8, to cover the current consumption of the vehicle body load 39 and other parts. Note that the ON/OFF switches SW1 and SW2 may be kept in the conductive state, in controlling the motor generator 16 to the power generation suspension state.

As described above, the motor generator 16 may be controlled to the combustion power generation state, the regeneration standby state, or the power generation suspension state, on the basis of the state of charge S_LIB of the lithium ion battery 27. Meanwhile, in vehicle deceleration, the motor generator 16 may be controlled to the regenerative power generation state, in terms of enhancement in energy efficiency of the vehicle 11 and higher fuel consumption performance. Note that the regenerative power generation state of the motor generator 16 may involve allowing the motor generator 16 to generate power in the vehicle deceleration, to convert kinetic energy of the vehicle 11 to electric energy. Whether to execute regenerative power generation of the motor generator 16 or not may be determined on the basis of conditions such as, but not limited to, the operation states of the accelerator pedal and the brake pedal. For example, the motor generator 16 may be controlled to the regenerative power generation state in the vehicle deceleration in which the stepping down of the accelerator pedal is released, or in the vehicle deceleration in which the brake pedal is stepped down. In contrast, the regenerative power generation state of the motor generator 16 may be cancelled when the accelerator pedal is stepped down, or when the stepping down of the brake pedal is released. Note that, when the regenerative power generation state of the motor generator 16 is cancelled, the motor generator 16 may be controlled to the combustion power generation state, the regeneration standby state, or the power generation suspension state, on the basis of the state of charge S_LIB at the time of the cancellation.

For example, when the brake pedal is stepped down, as denoted by a reference character C1 in FIG. 5, the motor generator 16 may be controlled to the regenerative power generation state. In controlling the motor generator 16 to the regenerative power generation state, the generated voltage V_ISG of the motor generator 16 may be controlled to a predetermined voltage Vb (a reference character B3) that is higher than the terminal voltage V_LIB of the lithium ion battery 27. This allows the generated current of the motor generator 16 to be supplied to the lithium ion battery 27 and the second power circuit 42, as denoted by the solid black arrow in FIG. 6. Note that the ON/OFF switches SW1 and SW2 may be kept in the conductive state, in controlling the motor generator 16 to the regenerative power generation state.

As described so far, controlling the generated voltage V_ISG of the motor generator 16 makes it possible to control the charge and discharge of the lithium ion battery 27. In one specific but non-limiting implementation, raising the generated voltage V_ISG above the terminal voltage V_LIB allows the lithium ion battery 27 to be charged, whereas lowering the generated voltage V_ISG below the terminal voltage V_LIB allows the lithium ion battery 27 to discharge. Moreover, the terminal voltage V_LIB of the lithium ion battery 27 may be set higher than the terminal voltage V_Pb of the lead battery 28. This allows for the charge and discharge of the lithium ion battery 27, with the ON/OFF switches SW1 and SW2 kept in the conductive state. In other words, it is possible to allow the lithium ion battery 27 to discharge, without separating the lead battery 28 from the lithium ion battery 27. This makes it possible to positively allow the lithium ion battery 27 to be charged or to discharge, without complicating a circuit structure or a switch control of the vehicle power source 10. Hence, it is possible to enhance the energy efficiency of the vehicle 11 and to reduce costs of the vehicle power source 10.

As illustrated in FIG. 6, in allowing the motor generator 16 to generate power, it is possible to positively charge the lithium ion battery 27, while suppressing charge of the lead battery 28. Specifically, because the internal resistance of the lithium ion battery 27 is lower than the internal resistance of the lead battery 28, it is possible to positively charge the lithium ion battery 27. Moreover, as illustrated in FIG. 8, in suspending the power generation of the motor generator 16, it is possible to positively allow the lithium ion battery 27 to discharge, while suppressing discharge of the lead battery 28. Specifically, because the terminal voltage V_LIB of the lithium ion battery 27 is higher than the terminal voltage V_Pb of the lead battery 28, it is possible to positively allow the lithium ion battery 27 to discharge. Such suppression of the charge and discharge of the lead battery 28 makes it possible to relieve requests for output characteristics and cycle characteristics of the lead battery 28, leading to reduction in costs of the lead battery 28. From this viewpoint as well, it is possible to reduce costs of the vehicle power source 10.

[Engine Start Control]

Figure 9:
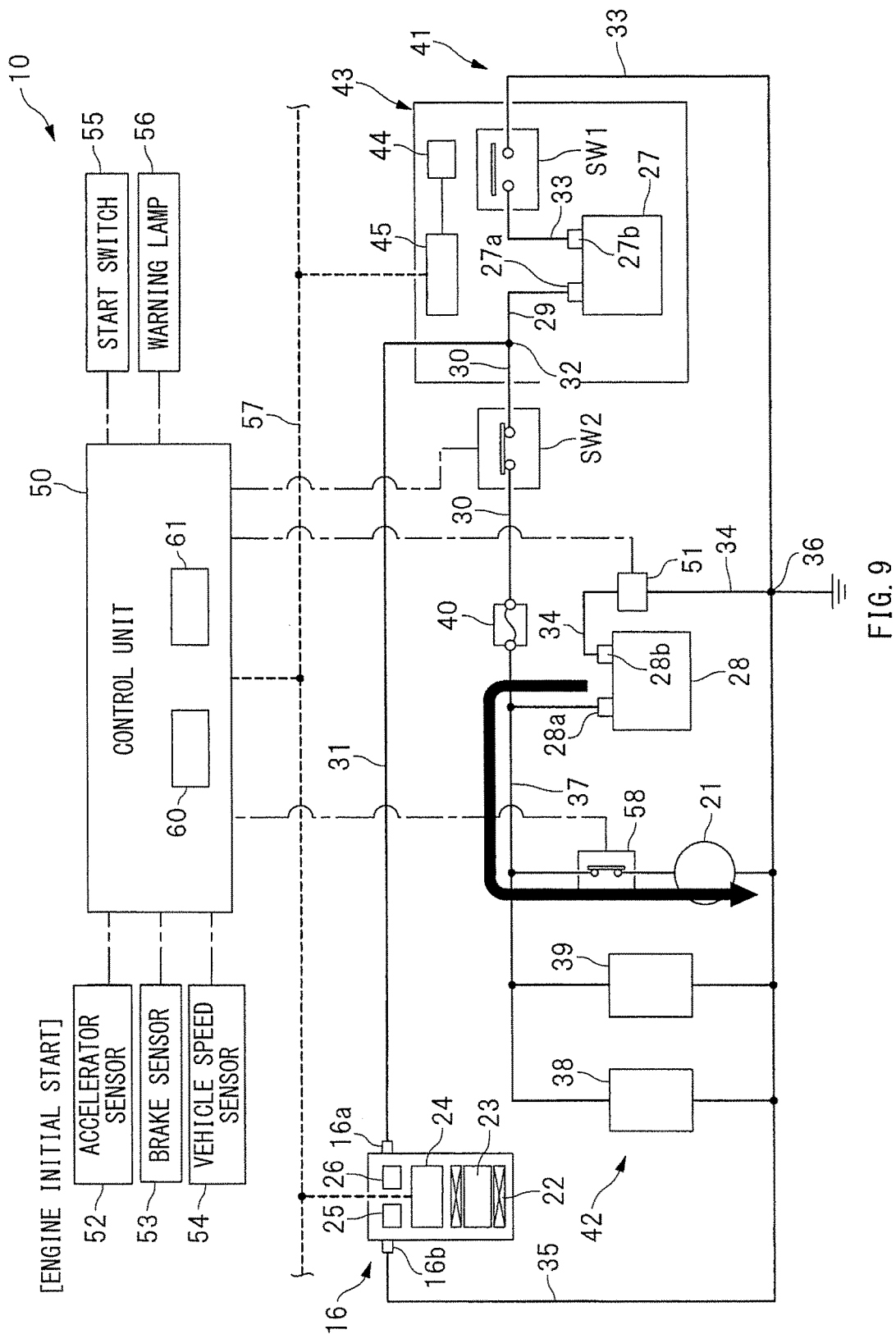
FIG. 9 illustrates a state of power supply of the vehicle power source.
Figure 10:
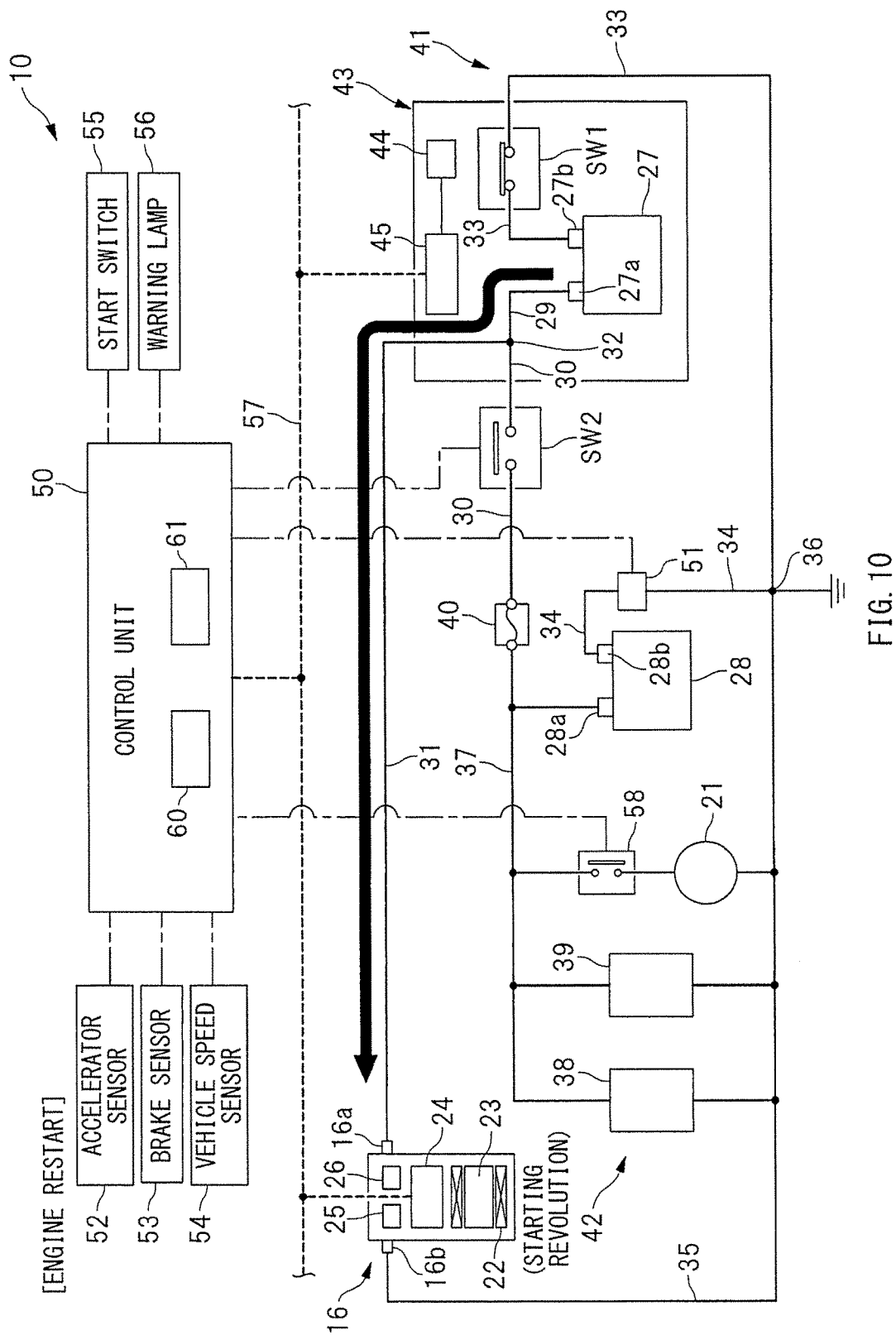
FIG. 10 illustrates a state of power supply of the vehicle power source.

Description is given next of the power supply states of the vehicle power source 10 at engine start. FIGS. 9 and 10 illustrate the power supply states of the vehicle power source 10. FIG. 9 illustrates the power supply state at initial start of the engine by operation of the start switch. FIG. 10 illustrates the power supply state at engine restart by the idling stop control.

Referring to FIG. 9, at the initial start of the engine by the operation of the start switch by a driver, the ON/OFF switch SW2 may be closed, and thereafter, a starter relay 58 may be closed. This may cause power supply from the lead battery 28 to the starter motor 21, allowing the engine 12 to be started by cranking operation of the starter motor 21. Note that the ON/OFF switch SW1 may be closed after the engine 12 is started. In the forgoing description, the ON/OFF switch SW1 may be opened in view of suppression of discharge of the lithium ion battery 27. However, this is non-limiting. For example, under a low temperature environment such as, but not limited to, a cold district, the ON/OFF switches SW1 and SW2 may be closed to allow the starter motor 21 to be supplied with power from both the lead battery 28 and the lithium ion battery 27.

Referring to FIG. 10, at the engine restart by the idling stop control, the ON/OFF switch SW2 may be opened, and thereafter, target drive torque of the motor generator 16 may be raised. This may cause power supply from the lithium ion battery 27 to the motor generator 16, allowing the engine 12 to be started by the cranking operation of the motor generator 16. At the engine restart by the idling stop control, the ON/OFF switch SW2 may be opened to separate the first power circuit 41 from the second power circuit 42. This makes it possible to prevent an instantaneous voltage drop of the second power circuit 42 with respect to the instantaneous voltage drop protection load 38. Hence, it is possible to keep the instantaneous voltage drop protection load 38 in operation during the engine restart, leading to enhanced vehicle quality.

[Fail-Safe Control]

In the following, description is given of a fail-safe control that may be executed by the vehicle power source 10. When the control unit 50 controls the motor generator 16, the control unit 50 may output a control signal to the ISG controller 24. If the inverter or the regulator in the ISG controller 24 should fail, or if communication abnormality should occur between the control unit 50 and the ISG controller 24, it is difficult to appropriately control the motor generator 16. If such abnormality should occur in the motor generator 16, it is desired that the motor generator 16 be promptly stopped. The control unit 50 of the vehicle power source 10 therefore includes an abnormality detector 60 and a switch controller 61. The abnormality detector 60 detects abnormality of the motor generator 16. The switch controller 61 controls the ON/OFF switches SW1 and SW2. The control unit 50 may execute the fail-safe control as described below, to detect presence or absence of the abnormality in the motor generator 16 and to control the ON/OFF switches SW1 and SW2 on the basis of a detection result of the abnormality.

Figure 11:
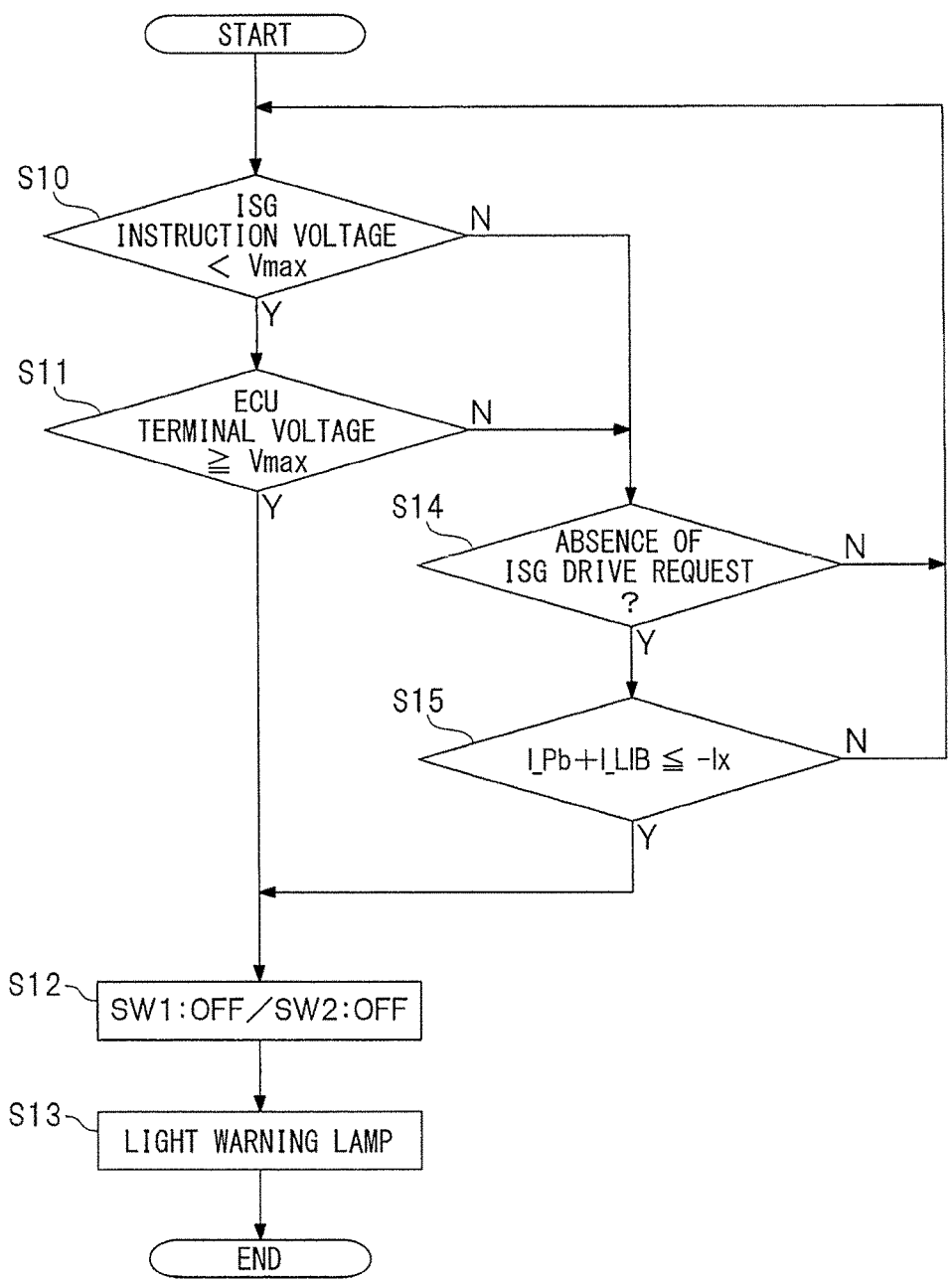
FIG. 11 is a flowchart of one example of a state of execution of a fail-safe control.
Figure 12:
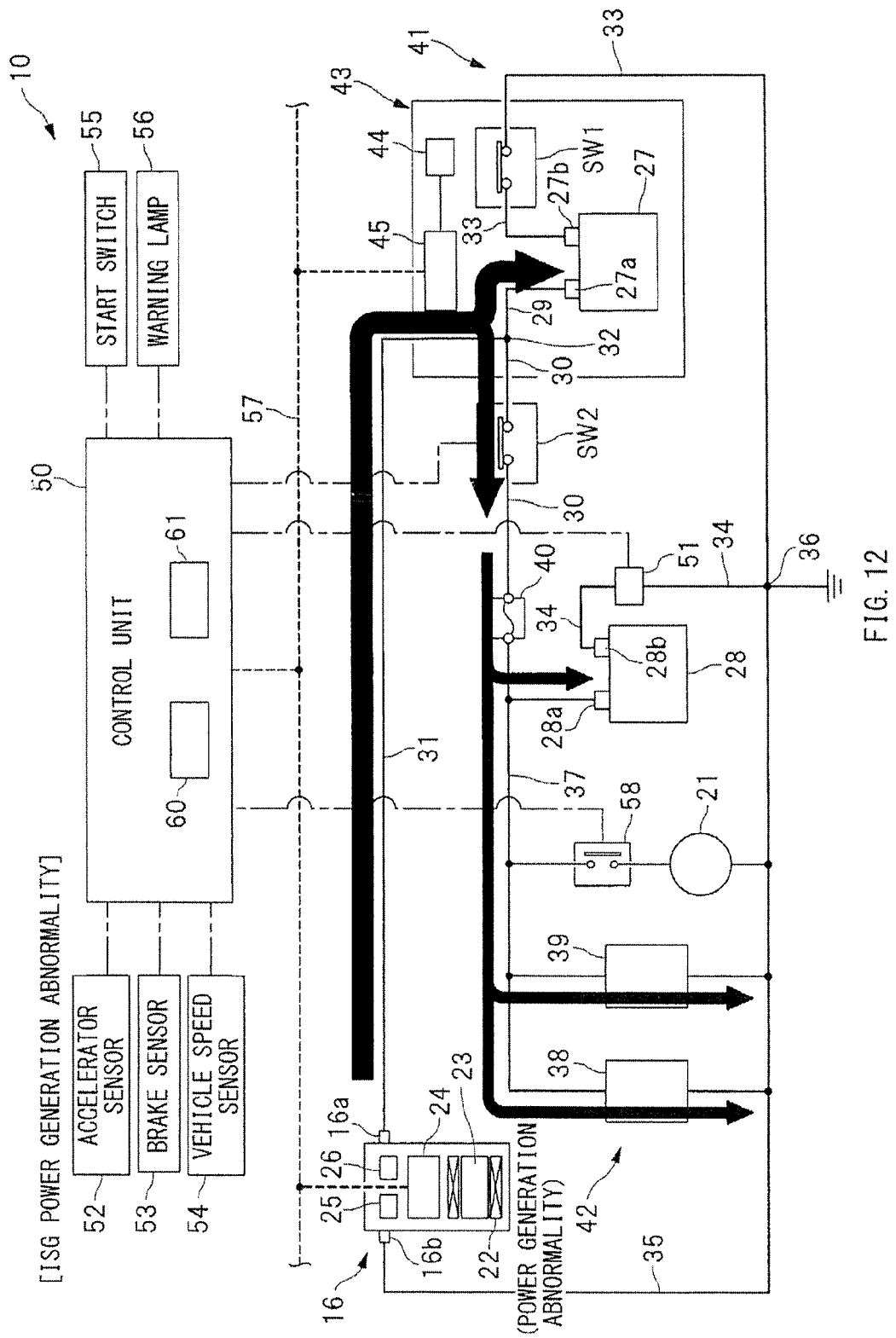
FIG. 12 illustrates a state of power supply of the vehicle power source.
Figure 13:
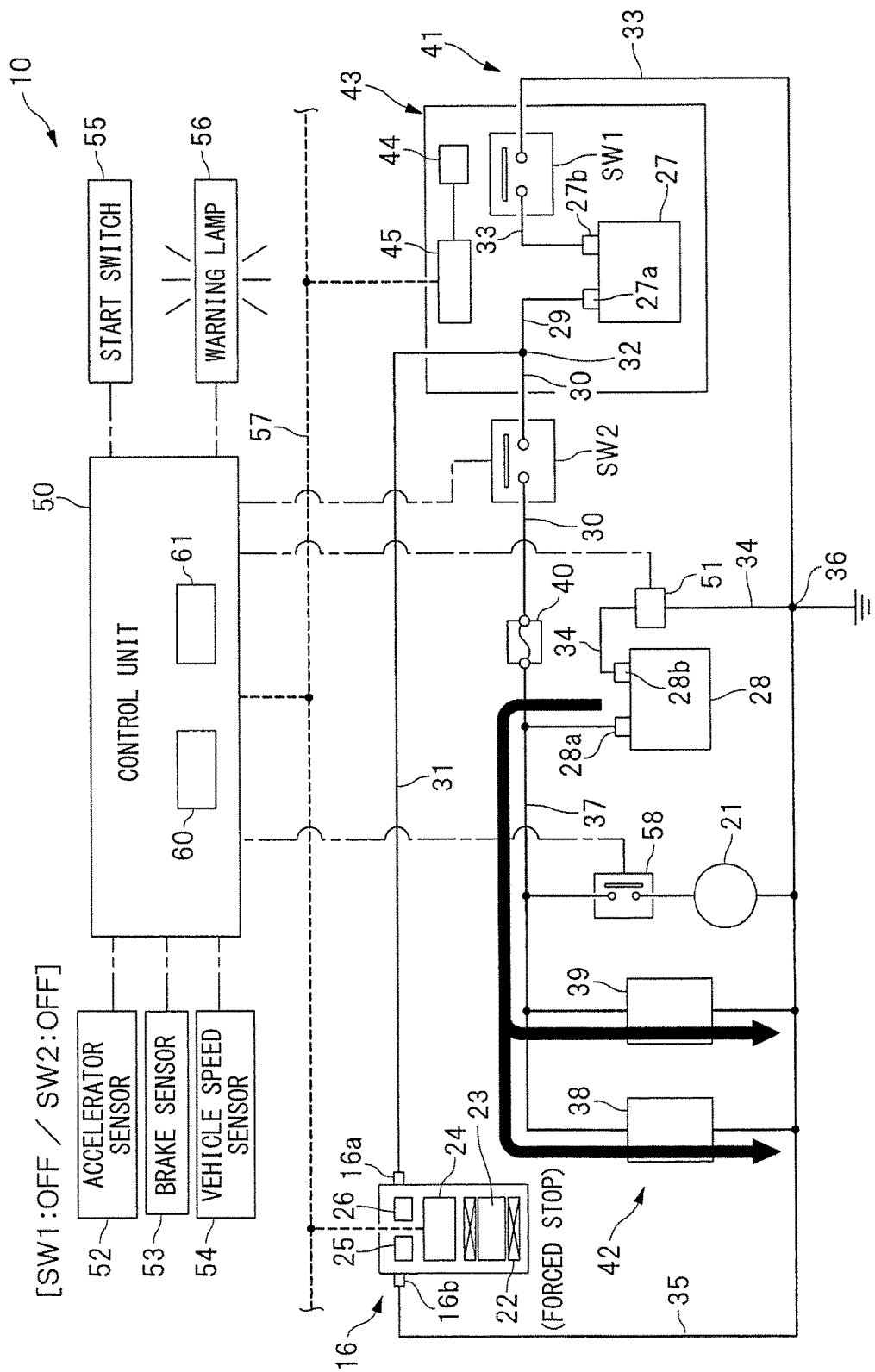
FIG. 13 illustrates a state of power supply of the vehicle power source.
Figure 14:
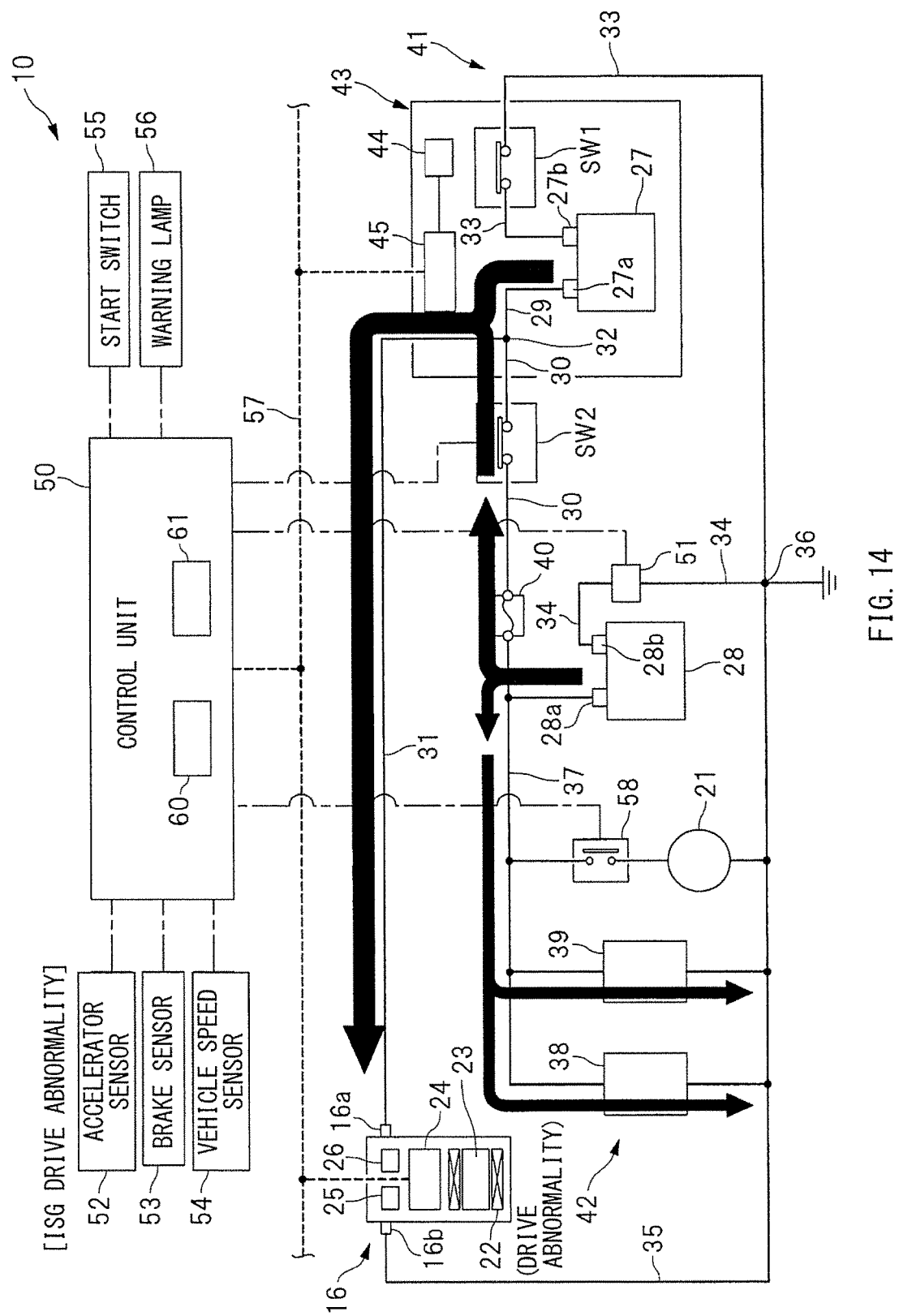
FIG. 14 illustrates a state of power supply of the vehicle power source.

FIG. 11 is a flowchart of one example of a state of execution of the fail-safe control. FIGS. 12 to 14 illustrate the power supply states of the vehicle power source 10. FIG. 12 illustrates a state in power generation abnormality of the motor generator 16. FIG. 13 illustrates a state with the ON/OFF switches SW1 and SW2 cut off in response to detection of the abnormality of the motor generator 16. FIG. 14 illustrates a state in drive abnormality of the motor generator 16.

Referring to FIG. 11, in step S10, determination may be made on whether or not an ISG instruction voltage outputted from the control unit 50 is lower than a predetermined upper limit voltage Vmax. In one implementation of the technology, the ISG instruction voltage may serve as an "instruction voltage", and the upper limit voltage Vmax may serve as a "voltage threshold". The ISG instruction voltage may be a target voltage instructed to the ISG controller 24 by the control unit 50. On the basis of the ISG instruction voltage, the ISG controller 24 may control the generated voltage of the motor generator 16. In step S10, when the ISG instruction voltage is determined as lower than the upper limit voltage Vmax, the flow may proceed to step S11. In step S11, determination may be made on whether or not an ECU terminal voltage is equal to or higher than the upper limit voltage Vmax. The ECU terminal voltage may be a voltage applied to the control unit 50 from the positive electrode terminal 37, i.e., a voltage corresponding to the generated voltage of the motor generator 16.

When, in step S10, the ISG instruction voltage is determined as lower than the upper limit voltage Vmax, and in subsequent step S11, the ECU terminal voltage is determined to be equal to or higher than the upper limit voltage Vmax, the flow may proceed to step S12. In step S12, the ON/OFF switches SW1 and SW2 may be controlled from the conductive state to the cut-off state. When, in step S12, the ON/OFF switches SW1 and SW2 are cut off, the flow may proceed to step S13. In step S13, the warning lamp 56 may be lighted to notify an occupant of the abnormality of the motor generator 16.

A situation that the ECU terminal voltage, i.e., the generated voltage of the motor generator 16 is higher than the upper limit voltage Vmax, with the ISG instruction voltage being lower than the upper limit voltage Vmax, may be a situation that, as illustrated in FIG. 12, the power generation abnormality occurs in the motor generator 16. In such a case in which presence of the power generation abnormality of the motor generator 16 is determined, the motor generator 16 may excessively generate power, causing possibility of excessive charge of the lithium ion battery 27, the lead battery 28, and other batteries or capacitors. The control unit 50 may therefore switch both the ON/OFF switches SW1 and SW2 to the cut-off state, as illustrated in FIG. 13, to separate the motor generator 16 from the first and second power circuits 41 and 42. This makes it possible to stop the power generation of the motor generator 16, and to prevent the excessive charge of the lithium ion battery 27 and other batteries or capacitors. Note that the vehicle body load 39 and other parts may be supplied with power from the lead battery 28 even when the ON/OFF switches SW1 and SW2 are cut off.

Meanwhile, in step S10, when the ISG instruction voltage is determined as higher than the upper limit voltage Vmax, or in step S11, when the ECU terminal voltage is determined as lower than the upper limit voltage Vmax, the flow may proceed to step S14. In step S14, determination is made on absence or presence of an output of an ISG drive request from the control unit 50 to the motor generator 16. In one implementation of the technology, the ISG drive request may serve as a "drive instruction". The ISG drive request may be a powering instruction outputted from the control unit 50 to the ISG controller 24. When the ISG drive request is outputted, the motor generator 16 may be controlled by the ISG controller 24 to a powered state. When, in step S14, the absence of the output of the ISG drive request is determined, the flow may proceed to step S15, in which discharge states of the batteries 27 and 28 may be determined. In step S15, determination may be made on whether or not a sum of the charge and discharge current I_Pb of the lead battery 28 and the charge and discharge current I_LIB of the lithium ion battery 27 is equal to or smaller than a predetermined current Ix set on discharge side (negative side). In other words, in step S15, determination may be made on whether or not the discharge currents of the lead battery 28 and the lithium ion battery 27 are higher than the predetermined current Ix. In one implementation of the technology, the predetermined current Ix may serve as a "current threshold".

When, in step S14, the absence of the output of the ISG drive request for the motor generator 16 is determined, and in subsequent step S15, the sum of the charge and discharge current I_Pb of the lead battery 28 and the charge and discharge current I_LIB of the lithium ion battery 27 are determined as higher than the predetermined current Ix, the flow may proceed to step S12. In step S12, the ON/OFF switches SW1 and SW2 may be controlled from the conductive state to the cut-off state. When, in step S12, the ON/OFF switches SW1 and SW2 are cut off, the flow may proceed to step S13. In step S13, the warning lamp 56 may be lighted to notify an occupant of the abnormality of the motor generator 16.

A situation that the discharge currents of the lead battery 28 and the lithium ion battery 27 are higher than the predetermined current Ix, in the absence of the output of the ISG drive request for the motor generator 16, may be a situation that, as illustrated in FIG. 14, the drive abnormality occurs in the motor generator 16. The drive abnormality of the motor generator 16 may be a situation that the motor generator 16 may be powered with accompanying excessive current consumption, i.e., a situation that the drive torque of the motor generator 16 may excessively increase. When the presence of the drive abnormality of the motor generator 16 is determined, the drive torque of the motor generator 16 may excessively increase, causing difficulty in appropriately controlling the engine 12. The control unit 50 may therefore switch both the ON/OFF switches SW1 and SW2 to the cut-off state, as illustrated in FIG. 13, to separate the motor generator 16 from the first and second power circuits 41 and 42. This makes it possible to stop the powering of the motor generator 16, and to appropriately control the engine 12. Note that the vehicle body load 39 and other parts may be supplied with power from the lead battery 28 even when the ON/OFF switches SW1 and SW2 are cut off.

As described so far, when the power generation abnormality or the drive abnormality of the motor generator 16 is recognized, the control unit 50 switches both the ON/OFF switches SW1 and SW2 to the cut-off state. This makes it possible to promptly stop the power generation or the powering of the motor generator 16, leading to enhanced reliability of the vehicle power source 10. Moreover, the control unit 50 is provided separately from the motor generator 16 and cuts off the ON/OFF switches SW1 and SW2. This allows for a simple configuration of the motor generator 16, leading to reduction in costs of the vehicle power source 10. In other words, it is unnecessary to incorporate a self-diagnosis function in the ISG controller 24, allowing for a simple configuration of the ISG controller 24 and reduction in costs of the motor generator 16. Furthermore, the ON/OFF switch SW2 may be inserted in the positive electrode line 37. This allows the lead battery 28 as a power source to be coupled to the vehicle body load 39 and other parts, even when the ON/OFF switches SW1 and SW2 are cut off in response to the detection of the abnormality of the motor generator 16. This allows for normal functioning of the vehicle body load 39 and other parts, even when the ON/OFF switches SW1 and SW2 are cut off. Hence, it is possible to ensure a minimum degree of travelling performance.

As described above, in the implementation of the technology, it is possible to reduce costs of the vehicle power source even in pursuit of enhancement in power generation performance and output performance o the motor generator. Specifically, the enhancement in the power generation performance and the output performance of the motor generator may cause excessive power generation of the motor generator, and cause an excessive increase in an output of the motor generator, if abnormality should occur in the motor generator. It is therefore desired that the motor generator be promptly stopped if the abnormality should occur in the motor generator. Possible measures may include to impart a self-diagnosis function to the motor generator, to monitor operation states of the motor generator, and to stop the motor generator as necessary. To impart the self-diagnosis function to the motor generator, however, may lead to a higher degree of functionalization of the motor controller, and incur higher costs of the vehicle power source. In the implementation of the technology, the ON/OFF switches SW1 and SW2 may be cut off by the control unit 50 that is provided separately from the motor generator 16, as described above. Hence, it is possible to reduce costs of the vehicle power source.

The technology is by no means limited to the implementations described above, and may be modified in variety of ways without departing from the scope of the subject matter of the technology. In the forgoing description, the "power storage" may include the two batteries 27 and 28, but this is non-limiting. The "power storage" may include a single power storage. Moreover, in the forgoing description, the lithium ion battery 27 may be adopted as the "first power storage", and the lead battery 28 may be adopted as the "second power storage". However, the "first power storage" and the "second power storage" are not limited to the lithium ion battery 27 and the lead battery 28, respectively; any power storage may be also adopted. For example, a lead battery, a nickel hydrogen battery, an electric double layered capacitor, and other batteries or capacitors may be adopted as the "first power storage". A lithium ion battery, a nickel hydrogen battery, an electric double layered capacitor, and other batteries or capacitors may be adopted as the "second power storage". Furthermore, it should be appreciated that a same kind of power storages that are different in terminal voltages or internal resistance may be adopted as the "first power storage" and the "second power storage". Note that, in combined use of the lithium ion battery 27 and the lead battery 28, an iron phosphate lithium ion battery may be adopted for the lithium ion battery 27. The iron phosphate lithium ion battery includes iron phosphate lithium as a positive electrode material.

In the forgoing description, the "switch" may include the two ON/OFF switches SW1 and SW2, but this is non-limiting. The "switch" may include a single switch. Moreover, in cutting off the ON/OFF switches SW1 and SW2 in response to the detection of the abnormality of the motor generator 16, the ON/OFF switch SW1 may be cut off first, or alternatively, the ON/OFF switch SW2 may be cut off first. Furthermore, in the forgoing description, the ON/OFF switches SW1 and SW2 each may be a semiconductor switch that includes a semiconductor element. However, this is non-limiting. The ON/OFF switches SW1 and SW2 each may be a switch that mechanically opens and closes a contact with use of force such as, but not limited to, electromagnetic force. In addition, in the forgoing description, the battery module 43 and the ON/OFF switch SW2 may be provided separately. However, this is non-limiting. The ON/OFF switch SW2 may be incorporated in the battery module 43. Alternatively, the ON/OFF switch SW1 may be separated from the battery module 43.

In the forgoing description, the generated voltage of the motor generator 16 may be determined on the basis of the ECU terminal voltage. However, this is non-limiting. The generated voltage of the motor generator 16 may be determined on the basis of a signal from a voltage sensor that may directly detect the generated voltage of the motor generator 16. Note that, in the forgoing description, the control unit 50 may include the abnormality detector 60 and the switch controller 61. However, this is non-limiting. Other control units or other controllers may include the abnormality detector 60 or the switch controller 61.

Although some preferred implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle power source mounted on a vehicle, the vehicle power source comprising:
   a motor generator coupled to an engine;
   a power storage coupled to the motor generator, the power storage comprising a first power storage and a second power storage, the first power storage and the second power storage coupled, in parallel with one another, to the motor generator;
   a switch controlled between a conductive state and a cut-off state, the conductive state involving coupling the motor generator to the power storage, and the cut-off state involving separating the motor generator from the power storage, the switch comprising:
      a first switch controlled between a first conductive state and a first cut-off state, the first conductive state involving coupling the motor generator to the first power storage, and the first cut-off state involving separating the motor generator from the first power storage; and
      a second switch controlled between a second conductive state and a second cut-off state, the second conductive state involving coupling the motor generator to the second power storage, and the second cut-off state involving separating the motor generator from the second power storage;
   an abnormality detector that is provided separately from the motor generator and detects abnormality of the motor generator; and
   a switch controller that is provided separately from the motor generator and controls 1) the first switch from the first conductive state to the first cut-off state and 2) the second switch from the second conductive state to the second cut-off state when the abnormality of the motor generator is detected.

2. The vehicle power source according to claim 1, wherein the abnormality detector determines presence of the abnormality of the motor generator, when a generated voltage of the motor generator is higher than a voltage threshold, with an instruction voltage to the motor generator being lower than the voltage threshold.

3. The vehicle power source according to claim 1, wherein the abnormality detector determines presence of the abnormality of the motor generator, when a discharge current of the power storage is higher than a current threshold, in absence of an output of a drive instruction to the motor generator.

4. The vehicle power source according to claim 2, wherein the abnormality detector determines presence of the abnormality of the motor generator, when a discharge current of the power storage is higher than a current threshold, in absence of an output of a drive instruction to the motor generator.

5. The vehicle power source according to claim 1, further comprising:
   a first conduction path coupled to a positive electrode terminal of the first power storage;
   a second conduction path coupled to a positive electrode terminal of the second power storage;
   a third conduction path coupled to a positive electrode terminal of the motor generator;
   a connection point that couples the first conduction path, the second conduction path, and the third conduction path together; and
   an electric load coupled to the positive electrode terminal of the second power storage through a fourth conduction path,
   wherein the second switch is inserted in the second conduction path.

6. The vehicle power source according to claim 2, further comprising:
   a first conduction path coupled to a positive electrode terminal of the first power storage;
   a second conduction path coupled to a positive electrode terminal of the second power storage;
   a third conduction path coupled to a positive electrode terminal of the motor generator;
   a connection point that couples the first conduction path, the second conduction path, and the third conduction path together; and
   an electric load coupled to the positive electrode terminal of the second power storage through a fourth conduction path,
   wherein the second switch is inserted in the second conduction path.

7. The vehicle power source according to claim 3, further comprising:
   a first conduction path coupled to a positive electrode terminal of the first power storage;
   a second conduction path coupled to a positive electrode terminal of the second power storage;
   a third conduction path coupled to a positive electrode terminal of the motor generator;
   a connection point that couples the first conduction path, the second conduction path, and the third conduction path together; and
   an electric load coupled to the positive electrode terminal of the second power storage through a fourth conduction path, wherein the second switch is inserted in the second conduction path.

8. The vehicle power source according to claim 4, further comprising:
a first conduction path coupled to a positive electrode terminal of the first power storage;
a second conduction path coupled to a positive electrode terminal of the second power storage;
a third conduction path coupled to a positive electrode terminal of the motor generator;
a connection point that couples the first conduction path, the second conduction path, and the third conduction path together; and
an electric load coupled to the positive electrode terminal of the second power storage through a fourth conduction path,
wherein the second switch is inserted in the second conduction path.

9. The vehicle power source according to claim 1, wherein internal resistance of the first power storage is lower than internal resistance of the second power storage.

10. The vehicle power source according to claim 2, wherein internal resistance of the first power storage is lower than internal resistance of the second power storage.

11. The vehicle power source according to claim 3, wherein internal resistance of the first power storage is lower than internal resistance of the second power storage.

12. The vehicle power source according to claim 4, wherein internal resistance of the first power storage is lower than internal resistance of the second power storage.

13. The vehicle power source according to claim 5, wherein internal resistance of the first power storage is lower than internal resistance of the second power storage.

14. The vehicle power source according to claim 6, wherein internal resistance of the first power storage is lower than internal resistance of the second power storage.

15. The vehicle power source according to claim 7, wherein internal resistance of the first power storage is lower than internal resistance of the second power storage.

16. The vehicle power source according to claim 8, wherein internal resistance of the first power storage is lower than internal resistance of the second power storage.

* * * * *